H. A. CLARK,

Assignor to THE CLARK INSULATED WIRE COMPANY.

MANUFACTURE OF COVERED WIRE FOR INSULATED CABLES.

No. 9,989. Reissued Dec. 27, 1881.

Witnesses,
Robt Everett
J. A. Rutherford

Inventor:
H. A. Clark.
By James L. Norris.
Atty

UNITED STATES PATENT OFFICE.

HENRY A. CLARK, OF BOSTON, MASSACHUSETTS, ASSIGNOR TO THE CLARK INSULATED WIRE COMPANY, OF ELIZABETH, NEW JERSEY, BRISTOL, PENNSYLVANIA, AND BOSTON, MASSACHUSETTS.

MANUFACTURE OF COVERED WIRE FOR INSULATED CABLES.

SPECIFICATION forming part of Reissued Letters Patent No. 9,989, dated December 27, 1881.

Original No. 242,885, dated June 14, 1881. Application for reissue filed November 29, 1881.

DIVISION B.

*To all whom it may concern:*

Be it known that I, HENRY A. CLARK, of Boston, in the county of suffolk and State of Massachusetts, have invented certain new and useful Improvements in Machines for Covering Wire with Insulating Material, of which the following is a full, clear, and exact description.

This invention relates to the manufacture of covered wire for insulated compound electrical conductors or cables for telegraphic or telephonic purposes, and has for its object to produce a compound conductor or cable which will be perfect in insulation and efficient and reliable in use, and, further, to provide an improved method of producing such compound conductors or cables.

To these ends my invention consists in forming a compound electrical conductor or cable by forcing, pressing, compacting, or molding around and between a series of wires arranged substantially parallel, or nearly so, an insulating material in a plastic state, and afterward vulcanizing the same, whereby the series of wires are surrounded by or embedded in one and the same homogeneous mass of insulating material, and are therein spaced or separated from each other by the intervening portions of the mass.

The invention also consists in a compound electrical conductor or cable composed of a series of wires surrounded by or embedded in a homogeneous mass of pressed or molded insulating material, and therein spaced or separated from each other by the intervening portions of the insulating mass.

Figure 1:
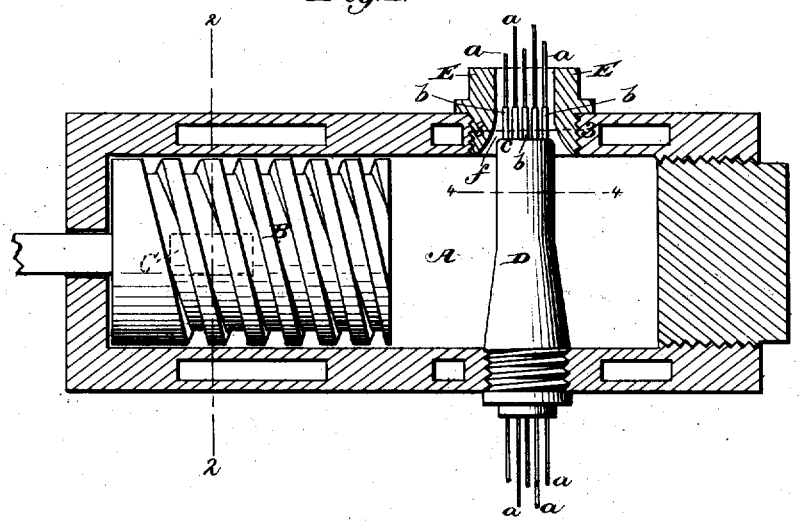
Figure 2:
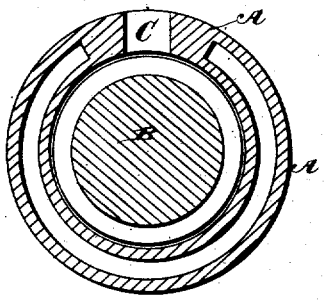
Figure 3:
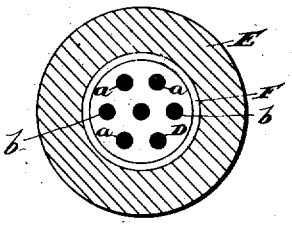
Figure 5:
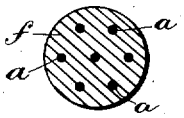
Figure 4:
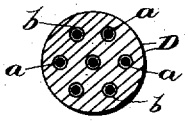

In the drawings, Figure 1 represents a central longitudinal sectional view of a machine or apparatus invented by me for carrying out my method of manufacturing compound electrical conductors or cables. Figs. 2, 3, and 4 are transverse sections on the lines 2 2, 3 3, and 4 4 respectively of Fig. 1. Fig. 5 is a cross-section of a compound electrical conductor or cable constructed in accordance with my invention.

In the drawings, A represents a chambered cylinder; B, a screw or worm arranged to turn within said cylinder; C, a hole which opens to the said screw intermediate of its length; D, the guide for the series of wires *a*, shown as running at right angles to the length of the screw B and cylinder A, and between the inner end of the screw and the closed head of the cylinder; E, the die or head-block, having an opening, F, through it, which axially is coincident with the axial line of the wire-guide D. All of these parts above described are constructed and arranged for the passage of a wire through the wire-guide D into the die-opening F, and at the same time for the forcing of the insulating material under pressure in a plastic state through the die-opening as the wire passes through the same.

The wire-guide D is provided with a series of guideways or tubes, *b*, which run in parallel lines, and, as shown, in the present instance they are seven in number, arranged one at and along the axial line of the guide, and the remainder in a circle about such central guide, and at equal distances apart. Each of these several guide-tubes is adapted for the free passage of a wire, and at the end *c* of the guide which is toward the die-opening F they each project and extend from the body portion *d* of the guide in parallel lines into the die-opening, and therein are separate and distinct from each other, so as to leave a free and open space between each of them and between them all and the wall of the die-opening F, which, of course, is made of sufficient diameter to admit the said series of wire-guide tubes and leave a space between them and the wall of the die-opening, as stated.

With a series of wire-guides, *b*, constructed and arranged in relation to each other and to the die-openings above described, obviously the material with which the several wires are to be insulated or coated, and in conjunction with which they are to pass through the die-opening, is forced around and circulates itself about the wire-guides *b* before reaching the wires which are issuing from the wire-guides at their open ends toward and within the die-opening, and as a consequence the insulating material in a plastic state is forced, pressed, compacted, or molded in a continuous mass about and between the series of wires as they issue from their several guide-tubes and between the wires and the wall of the die-opening, thereby securing a disposition or molding of the insulating material under pressure about and around the several wires, which material, so disposed, is in a homogeneous and in one and the same mass throughout. A separation of the wire-guides, as above described, before the wires issue from them and come into contact with the coating material being forced through the die opening, and thus secure the disposition of the coating material relative thereon, as above described, is absolutely essential, as otherwise the wires, from the pressure of the coating material, would be forced together, and thus the proper disposition of the coating material between and around and about them prevented.

Although I have herein particularly described the wire-guides as seven in number and arranged in a particular relation, it is plain that their number may be more or less and their relative arrangement varied, and therefore it is not intended to limit this invention to any particular number or to any particular relative arrangement of them, except that there is to be a series of wires, and practice has shown that seven wires can be simultaneously coated and covered with success, as described.

A compound wire or cable made as described is vulcanized, in order to preserve the disposition of the wires and of the insulating material specified, and also the proper form of the whole against derangement, and should be wrapped with cloth or other similar sheet material before vulcanizing it; but this obviously has no bearing upon my invention.

The wire-guide D, in lieu of being arranged at right angles to the line of direction of the screw or worm B and the chambered cylinder A, may be arranged in an axial line coincident with the axial line of the screw.

In Fig. 5, *a* are the wires, and *f* the coating or covering.

The material composing the insulating substance, which is forced, pressed, or compacted about and between the series of wires into one and the same homogeneous mass, consists of india-rubber, gutta-percha, or restored waste india-rubber or gutta-percha, in any of their vulcanizable or other compounds; and whichever insulating material is employed, it is introduced into the cylinder through the opening hereinbefore described, to be therein pressed or molded around and between the series of wires.

Having thus described my invention, what I claim, and desire to secure by Letters Patent, is—

1. The method of making compound electrical conductors or cables which consists in forcing, pressing, or compacting around a series of substantially parallel spaced or separated wires an insulating material in a plastic state, and afterward vulcanizing the same, whereby the series of wires are surrounded by or embedded in one and the same homogeneous mass, and are therein spaced or separated from each other, substantially as described.

2. The method of making cylindrical compound electrical conductors which consists in forcing, pressing, or compacting around and between a series of substantially parallel wires an insulating material in a plastic state, and afterward vulcanizing the homogeneous mass, substantially as described.

3. A compound conductor or cable composed of a series of wires surrounded by or embedded in a mass of pressed or molded insulating material, and therein spaced or separated from each other by the intervening portions of the homogeneous mass, substantially as described.

In testimony whereof I have hereunto set my hand in the presence of the subscribing witnesses.

HENRY A. CLARK.

Witnesses:
ALBERT H. NORRIS,
JAMES A. RUTHERFORD.